(12) United States Patent
Neidorff et al.

(10) Patent No.: US 8,922,189 B2
(45) Date of Patent: Dec. 30, 2014

(54) CONTROLLED ON-TIME BUCK PFC

(75) Inventors: Robert A. Neidorff, Bedford, NH (US); Bing Lu, Manchester, NH (US)

(73) Assignee: Texas Instruments Incorporated, Dallas, TX (US)

( * ) Notice: Subject to any disclaimer, the term of this patent is extended or adjusted under 35 U.S.C. 154(b) by 1642 days.

(21) Appl. No.: 12/273,460

(22) Filed: Nov. 18, 2008

(65) Prior Publication Data

US 2010/0123448 A1 May 20, 2010

(51) Int. Cl.
*G05F 5/00* (2006.01)
*G05F 1/70* (2006.01)
*H02M 1/42* (2007.01)
*H02M 3/157* (2006.01)
*H02M 3/158* (2006.01)
*H02M 5/257* (2006.01)
*G05F 1/00* (2006.01)

(52) U.S. Cl.
CPC . *G05F 1/70* (2013.01); *H02M 1/42* (2013.01); *H02M 3/157* (2013.01); *H02M 3/1588* (2013.01); *H02M 2001/4291* (2013.01); *Y02B 70/12* (2013.01); *Y02B 70/126* (2013.01); *Y02B 70/1466* (2013.01)
USPC ............................. 323/299; 323/324; 323/282

(58) Field of Classification Search
USPC .................................. 323/299, 224, 282, 284
See application file for complete search history.

(56) References Cited

U.S. PATENT DOCUMENTS

| | | | |
|---|---|---|---|
| 5,672,997 A * | 9/1997 | Shield | 327/538 |
| 5,982,649 A * | 11/1999 | Turner | 363/89 |
| 6,011,707 A * | 1/2000 | Mine | 363/89 |
| 6,229,288 B1 * | 5/2001 | Baretich et al. | 323/223 |
| 6,275,018 B1 | 8/2001 | Telefus et al. | |
| 6,381,150 B2 | 4/2002 | Telefus | |
| 6,909,266 B2 | 6/2005 | Kernahan et al. | |
| 7,391,630 B2 | 6/2008 | Acatrinei | |
| 7,505,287 B1 * | 3/2009 | Kesterson | 363/21.01 |
| 7,821,237 B2 * | 10/2010 | Melanson | 323/222 |
| 2004/0070378 A1* | 4/2004 | Baldwin et al. | 323/282 |
| 2005/0017699 A1* | 1/2005 | Stanley | 323/282 |

(Continued)

FOREIGN PATENT DOCUMENTS

WO 2007042517 4/2007

OTHER PUBLICATIONS

"A New Predictive Control Strategy for Power Factor Correction," 18th Annual IEEE Applied Power Electronics Conference and Exposition, Feb. 2003, vol. 1, pp. 403-409 (Wanfeng Zhang, Guang Feng and Yan-Fei Liu).

(Continued)

*Primary Examiner* — Adolf Berhane
*Assistant Examiner* — Henry Lee, III
(74) *Attorney, Agent, or Firm* — Alan A. R. Cooper; Frederick J. Telecky, Jr.

(57) ABSTRACT

An apparatus for generating an output voltage from an input voltage is provided. The apparatus comprises a switch that receives the input voltage, an inductor that is coupled to the switch, a capacitor coupled to the inductor with the output voltage being output from a node between the inductor and the capacitor, a measuring circuit that receives and measures the input voltage, and a controller that is coupled to the switch and to the measuring circuit. Additionally, the controller receives the measured input voltage and calculates an on-time for the switch based on the measured input voltage and actuates the switch for the on-time.

23 Claims, 2 Drawing Sheets

(56) References Cited

U.S. PATENT DOCUMENTS

2006/0002155 A1   1/2006   Shteynberg et al.
2008/0197786 A1*  8/2008   Schaible et al. ............. 315/224
2008/0205104 A1   8/2008   Lev et al.

OTHER PUBLICATIONS

"A Predictive Switching Modulator for Current Mode Control of High Power Factor Boost Rectifier," IEEE Transactions on Power Electronics, vol. 18 No. 1, Jan. 2003, pp. 114-123 (Souvik Chattopadhyay, V. Ramanarayanan and V. Jayashankar).

"A Digital Power Factor Correction (PFC) Control Strategy Optimized for DSP," IEEE Transactions on Power Electronics, vol. 19, No. 5, Nov. 2004, pp. 1474-1485 (Wanfeng Zhang, Guang Feng, Yan-Fei Liu and Bin Wu).

* cited by examiner

US 8,922,189 B2

CONTROLLED ON-TIME BUCK PFC

TECHNICAL FIELD

The invention relates generally to AC-DC converters and, more particularly, to buck power factor correction (PFC) AC-DC converter.

BACKGROUND

Conventional AC-DC converters, in particular buck PFC AC-DC converters or buck PFCs, employ precise current measurement systems or other comparable, complex schemes. Some examples of conventional AC-DC converters are U.S. Pat. Nos. 6,275,018; 6,381,150; 6,909,266; and 7,391,630; U.S. Patent Pre-Grant Pub. Nos. 2006/0002155 and 2008;0205104; Chattopadhyay et al., "A Predictive Switching Modulator for Current Mode Control of High Power Factor Boost Rectifier," *IEEE Transactions on Power Electronics*, Vol. 18, No. 1, Jan. 2003; Zhang et al., "A Digital Power Factor Correction (PFC) Control Strategy Optimized for DSP," *IEEE Transactions on Power Electronics*, Vol. 19, No. 6, November 2004; and Zhang et al., "A New Predictive Control Strategy for Power Factor Correction," *18th Annual IEEE Applied Power Electronics Conference and Exposition*, February 2003, vol. 1, pp. 403-409. Yet, none of these references disclose a buck PFC that does not employ a precise current measurement or other comparable, complex system.

SUMMARY

An embodiment of the present invention, accordingly, provides an apparatus for generating an output voltage from an input voltage. The apparatus comprises a switch that receives the input voltage; an inductor that is coupled to the switch; a capacitor coupled to the inductor, wherein the output voltage is output from a node between the inductor and the capacitor; a measuring circuit that receives and measures the input voltage; and a controller that is coupled to the switch and to the measuring circuit, wherein the controller receives the measured input voltage and calculates an on-time for the switch based on the measured input voltage, and wherein the controller actuates the switch for the on-time.

In accordance with an embodiment of the present invention, the on-time is proportional to the square of the input voltage divided by the difference between the input voltage and the output voltage.

In accordance with an embodiment of the present invention, the on-time is proportional to the input voltage.

In accordance with an embodiment of the present invention, the apparatus further comprises a second switch that is coupled between the first switch and ground, wherein the controller is adapted to actuate the second switch.

In accordance with an embodiment of the present invention, the first and second switches are NMOS FETs.

In accordance with an embodiment of the present invention, a reverse bias diode is coupled between the switch and ground.

In accordance with an embodiment of the present invention, an apparatus is provided for generating an output voltage from an input voltage. The apparatus comprises a bridge that receives the input voltage; an inductor that is coupled to the bridge; a capacitor coupled to the inductor, wherein the output voltage is output from a node between the inductor and the capacitor; a measuring circuit that receives and measures the input voltage; and a controller that is coupled to the bridge and to the measuring circuit, wherein the controller receives the measured input voltage and calculates an on-time, and wherein the on-time is a function of the measured input voltage, and wherein the controller actuates the bridge for the on-time.

In accordance with an embodiment of the present invention, the bridge further comprises a first FET that receives the input voltage at its drain, that is adapted to receive a first actuation signal at its gate from the controller, and that is coupled to the inductor at its source; and a second FET that is coupled to the source of the first FET at its drain, that is adapted to receive a second actuation signal at its gate, and that is coupled to ground at its source.

In accordance with an embodiment of the present invention, the first and second FETs are NMOS FETs.

In accordance with an embodiment of the present invention, the bridge further comprises a FET that receives the input voltage at its drain, that is adapted to receive a first actuation signal at its gate from the controller, and that is coupled to the inductor at its source; and a reverse bias diode coupled between the source of the FET and ground.

In accordance with an embodiment of the present invention, a method for generating an output voltage from an input voltage. The method comprises receiving the input voltage by a switch and by a measuring circuit; measuring the input voltage with the measuring circuit; calculating an on-time for the switch, wherein the on-time is a function of the measured input voltage; actuating the switch for the on-time; and supplying an input current and the input voltage to an inductor.

In accordance with an embodiment of the present invention, the method further comprises actuating a second switch that is coupled to the inductor.

The foregoing has outlined rather broadly the features and technical advantages of the present invention in order that the detailed description of the invention that follows may be better understood. Additional features and advantages of the invention which form the subject of the claims of the invention will be described hereinafter. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION

Figure 1:
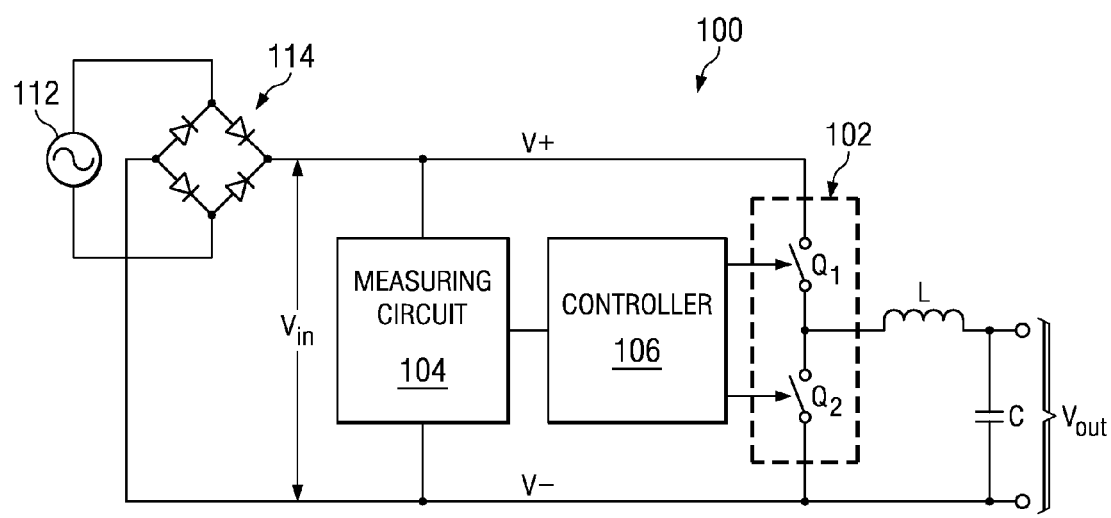
FIG. 1 is a buck PFC in accordance with an embodiment of the present invention.

Refer now to the drawings wherein depicted elements are, for the sake of clarity, not necessarily shown to scale and wherein like or similar elements are designated by the same reference numeral through the several views.

Buck PFC AC-DC converters or buck PFCs are more efficient that boost PFC AC-DC converters for low lines, such as the standard 110V used in the United States compared to 220V used in Europe. One drawback of buck PFCs is the input current distortion for times when the input voltage is less than the output voltage. However, with less than a 400 W output, the current distortion is acceptable because the buck PFC has a low enough harmonic energy to meet the British Standards Institution (BSI) EN61000 series standards, as well as other comparable standards.

Figure 2:
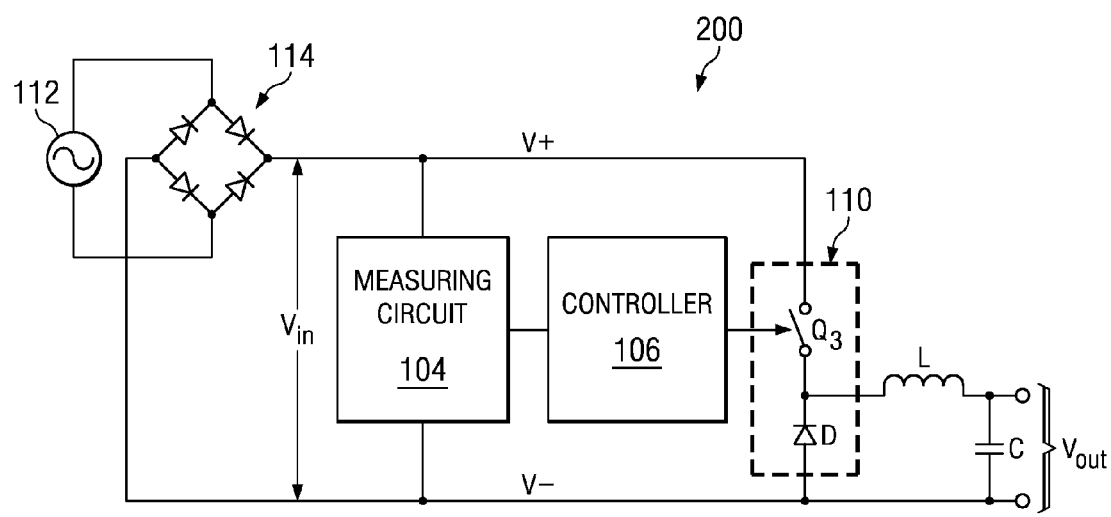
FIG. 2 is a buck PFC in accordance with an embodiment of the present invention.

Referring now to FIGS. 1 and 2 of the drawings, the reference numerals 100 and 200 generally designate buck PFCs in accordance with embodiment of the present invention. Each of converters 100 and 200 are generally comprised of a measuring circuit 104, a controller 106, an inductor L, and a capacitor C. A difference between the converters 100 and 200 is the bridges 102 and 110 shown in FIGS. 1 and 2, respectively. Each of these converters 100 and 200 receives AC signal from an AC source 112 (such as an outlet) and partially rectifies the AC signal with a full-wave bridge 114.

The bridge 102 is a conventional switching half-bridge. Bridge 102 is generally comprised of a pair of switches $Q_1$ and $Q_2$ (which are preferably NMOS FETs). Switch $Q_1$ is generally referred to as a high-side switch and is coupled at its drain to a positive voltage rail $V_+$, which supplies a positive input voltage to switch $Q_1$. Switch $Q_2$ is generally referred to as a low-side switch and is coupled between the switch $Q_1$ and the negative rail $V_-$ (with its drain being coupled to the switch $Q_1$ and its source coupled to the negative rail $V_-$). Each of the switches $Q_1$ and $Q_2$ are coupled at their gates to the controller 106 so that the controller 106 can provide actuation signals to switches $Q_1$ and $Q_2$.

The bridge 110, instead of employing a switching half-bridge, uses a diode D in conjunction with a switch $Q_3$. As with switch $Q_1$, switch $Q_3$ (which is preferably an NMOS FET) is coupled at its drain to a voltage rail $V_+$, and switch $Q_3$ is adapted to receive an actuation signal from the controller 106. A reverse bias diode D is coupled between the source of switch $Q_3$ and the negative voltage rail $V_-$.

Each of bridges 110 and 102 are then coupled to an LC combination. Preferably, there is an inductor L coupled at a first terminus to a node within bridges 110 and 102 (between switches $Q_1$ and $Q_2$ or between switch $Q_3$ and diode D). The other terminus of inductor L is coupled to a capacitor C, which also operates as an output node for the output voltage.

As can be seen in FIGS. 1 and 2, there is no feedback loop between the output and the controller. Instead the controller 106 and measuring circuit 104 operate on an open loop system. Measuring circuit 104 (which is preferably a digital voltmeter or an analog signal conditioner) generally measures or senses the input voltage $V_{in}$ (voltage difference between the positive voltage rail $V_+$ and the negative voltage rail $V_-$) continually and outputs the measured or sensed voltage to the controller 106. The controller 106 can then calculate an on-time for switches $Q_1$ or $Q_3$ based on the measured input voltage. The on-time is generally a function of the measured input voltage. Preferably, the on-time is proportional to the input voltage $V_{in}$ or is as follows:

$$\text{on-time} \propto \frac{V_{in}^2}{V_{in} - V_{out}} \quad (1)$$

Figure 3:
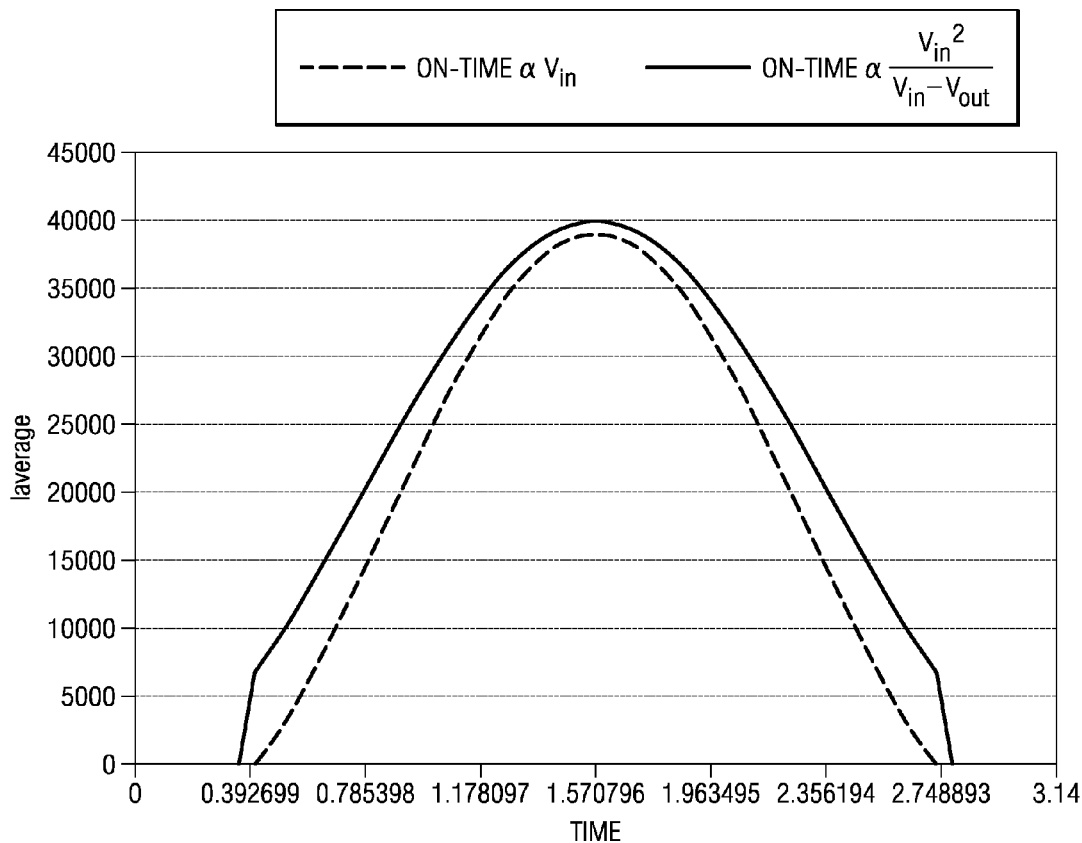
FIG. 3 is a diagram of the average output currents of the buck PFCs of FIGS. 1 and 2.

Preferably, though, to avoid a feedback measurement, an on-time that is proportional to the input voltage is employed, which (as can be seen in FIG. 3) has approximately the same output current but has a smoother waveform. Thus, a buck PFC as provided does not require any feedback or a precise output current sensing scheme.

Figure 4A:
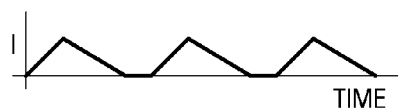
FIGS. 4A through 4C are timing diagrams for the buck PFCs of FIGS. 1 and 2.
Figure 4B:
Figure 4C:

Additionally, FIGS. 4A and 4B depict discontinuous and continuous current mode operations for converters 100 and 200. However, converters 100 and 200 can operate optimally if the switching frequency of the converter 100 or 200 varies so that the converter 100 or 200 operates generally at the boundary between continuous current and discontinuous current as shown in FIG. 4C. In other words, converters 100 and 200 can operate optimally if the switch $Q_1$ or $Q_3$ is on for a calculated time and is off until the current of inductor L decays to about zero. The mode depicted in FIG. 4C is referred to as a transition mode or critical conduction mode.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Accordingly, it is appropriate that the appended claims be construed broadly and in a manner consistent with the scope of the invention.

The invention claimed is:

1. An apparatus for generating an output voltage from an input voltage, the apparatus comprising:
   a full wave bridge rectifier having a positive rail as an output of the full wave bridge rectifier and a negative rail as an input of the full wave bridge rectifier;
   a switch that receives the input voltage minus a voltage drop across a diode of the full wave bridge rectifier on the positive rail;
   an inductor that is coupled to an output of the switch;
   a capacitor coupled to the inductor, wherein the output voltage is output from between:
      a) a node between the inductor and the capacitor and
      b) the negative rail;
   a measuring circuit that receives and measures a voltage difference of the voltage between the positive rail output by the full wave bridge rectifier and the negative rail input into the full wave bridge rectifier, the negative rail also coupled to the measuring circuit and the capacitor; and
   a controller that is coupled to both the switch and to the measuring circuit, wherein the controller receives the measured voltage difference between the positive rail output by the full wave bridge rectifier and the negative rail input into the full wave bridge rectifier and calculates an on-time for the switch attributed to the measured voltage difference of the positive rail and the negative rail, and wherein the controller actuates the switch for the on-time,
   wherein the controller and the measuring circuit operate in an open loop control system due to the measured voltage difference between the positive rail output by the full wave bridge rectifier and the negative rail input into the full wave bridge rectifier.

2. The apparatus of claim 1, wherein the on-time is proportional to the square of the input voltage divided by the difference between the input voltage and the output voltage.

3. The apparatus of claim 1, wherein the on-time is proportional to the input voltage.

4. The apparatus of claim 1, wherein the apparatus further comprises a second switch that is coupled between the first switch and ground, wherein the controller is adapted to actuate the second switch.

5. The apparatus of claim 4, wherein the first and second switches are NMOS FETs.

6. The apparatus of claim 1, wherein a reverse bias diode is coupled between the switch and ground.

7. An apparatus for generating an output voltage from an input voltage, the apparatus comprising:
- a full wave bridge rectifier that receives the input voltage having a positive rail as an output of the full wave bridge rectifier and a negative rail as an input of the full wave bridge rectifier;
- a switch half bridge coupled to the positive rail and the negative rail, including:
  a) a first switch that receives the input voltage minus a voltage drop across a diode of the full wave bridge rectifier on the positive rail;
  b) a second switch that is coupled to an output of the first switch and having an output that is coupled to the negative rail;
- an inductor that is coupled to a node between the first switch and the second switch;
- a capacitor coupled to the inductor, wherein the output voltage is output between:
  a) a node between the inductor and the capacitor; and
  b) the negative rail;
- a measuring circuit that receives and measures the voltage difference between a coupled the positive rail output by the full wave bridge rectifier and the negative rail input into the full wave bridge rectifier, the negative rail further coupled to the capacitor; and
- a controller that is coupled to both the bridge, and is further coupled to the first switch and the second switch, and to the measuring circuit, wherein the controller receives the measured input voltage difference and calculates an on-time, and wherein the on-time is a function of the measured voltage difference between the positive rail and the negative rail, and wherein the controller actuates the bridge for the on-time,
- wherein the controller and the measuring circuit operate in an open loop control system due to the measured voltage difference between the positive rail output by the full wave bridge rectifier and the negative rail input into the full wave bridge rectifier.

8. The apparatus of claim 7, wherein the on-time is proportional to the square of the input voltage divided by the difference between the input voltage and the output voltage.

9. The apparatus of claim 7, wherein the on-time is proportional to the input voltage.

10. The apparatus of claim 7, wherein the bridge further comprises:
- a first FET that receives the input voltage at its drain, that is adapted to receive a first actuation signal at its gate from the controller, and that is coupled to the inductor at its source; and
- a second FET that is coupled to the source of the first FET at its drain, that is adapted to receive a second actuation signal at its gate, and that is coupled to ground at its source.

11. The apparatus of claim 10, wherein the first and second FETs are NMOS FETs.

12. The apparatus of claim 7, wherein the bridge further comprises
- a FET that receives the input voltage at its drain, that is adapted to receive a first actuation signal at its gate from the controller, and that is coupled to the inductor at its source; and
- a reverse bias diode coupled between the source of the FET and ground.

13. The apparatus of claim 12, wherein the FET is an NMOS FET.

14. A method for generating an output voltage from an input voltage, the method comprising:
- receiving the input voltage by a full wave bridge rectifier having a positive rail as an output of the full wave bridge rectifier and an negative rail as an input to the full wave rectifier;
- receiving the input voltage minus a voltage drop across a diode of the full wave bridge rectifier on the positive rail at:
  a) an input to a switch and
  b) by a measuring circuit on a positive rail;
- measuring the input voltage difference between the positive rail and the negative rail, the negative rail coupled the measuring circuit and a capacitor, with the measuring circuit;
- calculating an on-time for the switch, wherein the on-time is a function of the measured input voltage difference between the positive rail and the negative rail;
- actuating the switch for the on-time; and
- supplying an input current and the input voltage to an inductor, the inductor coupled to the capacitor,
- wherein the controller and the measuring circuit operate in an open loop control system due to the measured voltage difference between the positive rail output by the full wave bridge rectifier and the negative rail input into the full wave bridge rectifier.

15. The method of claim 11, wherein the on-time is proportional to the square of the input voltage divided by the difference between the input voltage and the output voltage.

16. The method of claim 14, wherein the on-time is proportional to the input voltage.

17. The method of claim 14, wherein the method further comprises actuating a second switch that is coupled to the inductor.

18. The apparatus of claim 1, wherein an input of a full bridge rectifier is coupled to the negative rail, and an output of the full bridge rectifier is coupled to the positive rail.

19. The apparatus of claim 7, wherein the bridge is a full bridge rectifier, and an input of the full bridge rectifier is coupled to the negative rail, and an output of the full bridge rectifier is coupled to the positive rail.

20. The method of claim 14, wherein an input of a full bridge rectifier is coupled to the negative rail, and an output of the full bridge rectifier is coupled to the positive rail.

21. The apparatus of claim 1, wherein the input voltage is generated by an alternating current source.

22. The apparatus of claim 7, wherein the input voltage is generated by an alternating current source.

23. The method of claim 14, wherein the input voltage is generated by an alternating current source.

* * * * *